(12) United States Patent
Patel et al.

(10) Patent No.: US 10,041,676 B2
(45) Date of Patent: Aug. 7, 2018

(54) SEALED CONICAL-FLAT DOME FOR FLIGHT ENGINE COMBUSTORS

(71) Applicant: GENERAL ELECTRIC COMPANY, Schenectady, NY (US)

(72) Inventors: Nayan Vinodbhai Patel, Liberty Township, OH (US); Kwanwoo Kim, Cincinnati, OH (US); Chad Holden Sutton, Cincinnati, OH (US); Duane Douglas Thomsen, Lebanon, OH (US); Craig Alan Gonyou, Blanchester, OH (US); Harris Daniel Abramson, Cincinnati, OH (US); James A. Russo, Cincinnati, OH (US); Robert Andrew Stowers, Buffalo, NY (US); Shanwu Wang, Mason, OH (US); Anquan Wang, Mason, OH (US)

(73) Assignee: General Electric Company, schenectady, NY (US)

( * ) Notice: Subject to any disclaimer, the term of this patent is extended or adjusted under 35 U.S.C. 154(b) by 499 days.

(21) Appl. No.: 14/794,016

(22) Filed: Jul. 8, 2015

(65) Prior Publication Data

US 2017/0009986 A1  Jan. 12, 2017

(51) Int. Cl.
*F23R 3/02* (2006.01)
*F23R 3/00* (2006.01)
(Continued)

(52) U.S. Cl.
CPC ............... *F23R 3/002* (2013.01); *F02C 3/04* (2013.01); *F23R 3/50* (2013.01); *F23R 3/60* (2013.01);
(Continued)

(58) Field of Classification Search
CPC .... F23R 3/002; F23R 3/50; F23R 3/60; F23R 2900/03041; F23R 2900/03044
See application file for complete search history.

(56) References Cited

U.S. PATENT DOCUMENTS 5,285,632 A * 2/1994 Halila ...................... F23R 3/10
60/747
5,307,637 A * 5/1994 Stickles .................. F23R 3/002
60/756

(Continued)

FOREIGN PATENT DOCUMENTS

EP 0821201 A1 1/1998
EP 1271059 A2 1/2003

(Continued)

OTHER PUBLICATIONS

Notification of Reasons for Refusal issued in connection with corresponding JP Application No. 2016-129509 dated Jun. 13, 2017.

(Continued)

*Primary Examiner* — Lorne Meade
(74) *Attorney, Agent, or Firm* — General Electric Company; Pamela Kachur

(57) ABSTRACT

A combustor assembly for a gas turbine engine defining an axial direction is provided. The combustor assembly generally includes a liner, an annular dome, and a deflector plate. The liner at least partially defines a combustion chamber. The annular dome defines a first cavity and has a plurality of impingement holes, and the deflector plate defines a conical surface and a flat surface, wherein a plurality of cooling holes are defined through the deflector plate. The annular dome and the deflector plate are positioned together to define a second cavity that is in fluid communication with the first cavity through the plurality of impingement holes.

(Continued)

In addition, the second cavity is in fluid communication with the combustion chamber through the plurality of cooling holes.

18 Claims, 6 Drawing Sheets

(51) Int. Cl.
*F23R 3/50* (2006.01)
*F23R 3/60* (2006.01)
*F02C 3/04* (2006.01)

(52) U.S. Cl.
CPC .............. *F23R 2900/03041* (2013.01); *F23R 2900/03044* (2013.01); *Y02T 50/675* (2013.01)

(56) References Cited

U.S. PATENT DOCUMENTS

| | | | |
|---|---|---|---|
| 5,323,604 A * | 6/1994 | Ekstedt | F23R 3/34 |
| | | | 60/747 |
| 5,363,643 A * | 11/1994 | Halila | F23R 3/002 |
| | | | 60/752 |
| 5,509,270 A | 4/1996 | Pearce et al. | |
| 5,682,747 A * | 11/1997 | Brown | F23R 3/10 |
| | | | 60/746 |
| 5,941,076 A | 8/1999 | Sandelis | |
| 5,956,955 A | 9/1999 | Schmid | |
| 6,314,739 B1 | 11/2001 | Howell et al. | |
| 6,725,667 B2 | 4/2004 | Farmer et al. | |
| 7,260,936 B2 | 8/2007 | Patel et al. | |
| 7,451,600 B2 | 11/2008 | Patel et al. | |
| 7,845,174 B2 | 12/2010 | Parkman et al. | |
| 7,856,826 B2 | 12/2010 | Brown et al. | |
| 7,905,093 B2 | 3/2011 | Li et al. | |
| 8,281,597 B2 | 10/2012 | Li et al. | |
| 8,348,180 B2 | 1/2013 | Mao et al. | |
| 8,545,180 B1 * | 10/2013 | Liang | F01D 5/186 |
| | | | 415/115 |
| 8,657,576 B2 * | 2/2014 | Tibbott | F01D 5/187 |
| | | | 416/96 R |
| 2012/0272652 A1 | 11/2012 | Nicholls et al. | |
| 2013/0174562 A1 | 7/2013 | Holcomb et al. | |
| 2014/0096527 A1 | 4/2014 | Bangerter et al. | |

FOREIGN PATENT DOCUMENTS

| | | |
|---|---|---|
| EP | 1290378 A1 | 3/2003 |
| JP | 2011-523020 A | 8/2011 |
| WO | 2015/038274 A1 | 3/2015 |

OTHER PUBLICATIONS

U.S. Appl. No. 62/017,472, filed Jun. 26, 2014.
Search Report issued in connection with corresponding EP Application No. 16178152.1 dated Nov. 21, 2016.

* cited by examiner

SEALED CONICAL-FLAT DOME FOR FLIGHT ENGINE COMBUSTORS

FIELD OF THE INVENTION

The present subject matter relates generally to a gas turbine engine, or more particularly to a combustor assembly for a gas turbine engine.

BACKGROUND OF THE INVENTION

A gas turbine engine generally includes a fan and a core arranged in flow communication with one another. Additionally, the core of the gas turbine engine general includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere.

The combustion section of the gas turbine engine must withstand extremely high operating temperatures. For example, the ignited air/fuel mixture in the combustor can reach temperatures in excess of about 3500° F. (about 1930° C.). Due to these high temperatures, heat shields (e.g., deflector plates) are typically placed around each air/fuel mixer to protect other combustor components from the ignited air/fuel mixture. Deflector plates may be fabricated from various materials that are preferably characterized by mechanical and environmental properties that are particularly well suited for its use as a heat shield in the combustor environment of a gas turbine engine.

More commonly, non-traditional high temperature materials, such as ceramic matrix composite (CMC) materials, are being used as structural components within gas turbine engines. For example, given the ability for CMC materials to withstand relatively extreme temperatures, there is particular interest in replacing components within the combustion section of the gas turbine engine with CMC materials. More particularly, one or more heat shields of gas turbine engines are more commonly being formed of CMC materials. In addition, or alternatively, combustor components may receive thermal barrier coatings to ensure improved durability in high temperature environments.

Even with the advance of high temperature materials, combustor components that are closest in proximity to the combustion flame are still at risk of premature degradation. Uniform, non-varying combustion in the combustion chamber is desirable to improve engine performance and efficiency. In this regard, the components of the combustion chamber are carefully designed to ensure that injected fuel is properly mixed with compressed air to achieve the optimal air/fuel ratio, the entire air-fuel mixture is uniformly distributed within the combustion chamber, and complete combustion of the mixture is achieved. Notably, while improved fuel distribution improves engine efficiency, it may also result in the combustion flame remaining closer to the dome portion of the combustor, which may thereby be heated beyond desirable levels.

Accordingly, a combustor for a gas turbine engine capable of evenly distributing and optimally combusting the air-fuel mixture would be useful. In addition, a combustor that improves flow stability in the combustor while ensuring combustor components do not experience unacceptable temperatures, thus improving the operational capability and durability of the engine, would be particularly beneficial.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, a combustor assembly for a gas turbine engine defining an axial direction is provided. The combustor assembly generally includes a liner, an annular dome, and a deflector plate. The liner at least partially defines a combustion chamber. The annular dome defines a first cavity and has a plurality of impingement holes, and the deflector plate defines a conical surface and a flat surface, wherein a plurality of cooling holes are defined through the deflector plate. The annular dome and the deflector plate are positioned together to define a second cavity that is in fluid communication with the first cavity through the plurality of impingement holes. In addition, the second cavity is in fluid communication with the combustion chamber through the plurality of cooling holes.

In another exemplary embodiment of the present disclosure, a gas turbine engine is provided. The gas turbine engine defines an axial direction and generally includes a compressor section, a turbine section, and a combustor assembly. The turbine section is mechanically coupled to the compressor section through a shaft, and a combustor assembly is disposed between the compressor section and the turbine section. The combustor assembly has a longitudinal axis and generally includes a liner, an annular dome, and a deflector plate. The liner at least partially defines a combustion chamber. The annular dome defines a first cavity and has a plurality of impingement holes, and the deflector plate comprises a conical surface, a flat surface, and a plurality of cooling holes. The annular dome and the deflector plate define a second cavity that is in fluid communication with the first cavity through the plurality of impingement holes. In addition, the second cavity is in fluid communication with the combustion chamber through the plurality of cooling holes.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
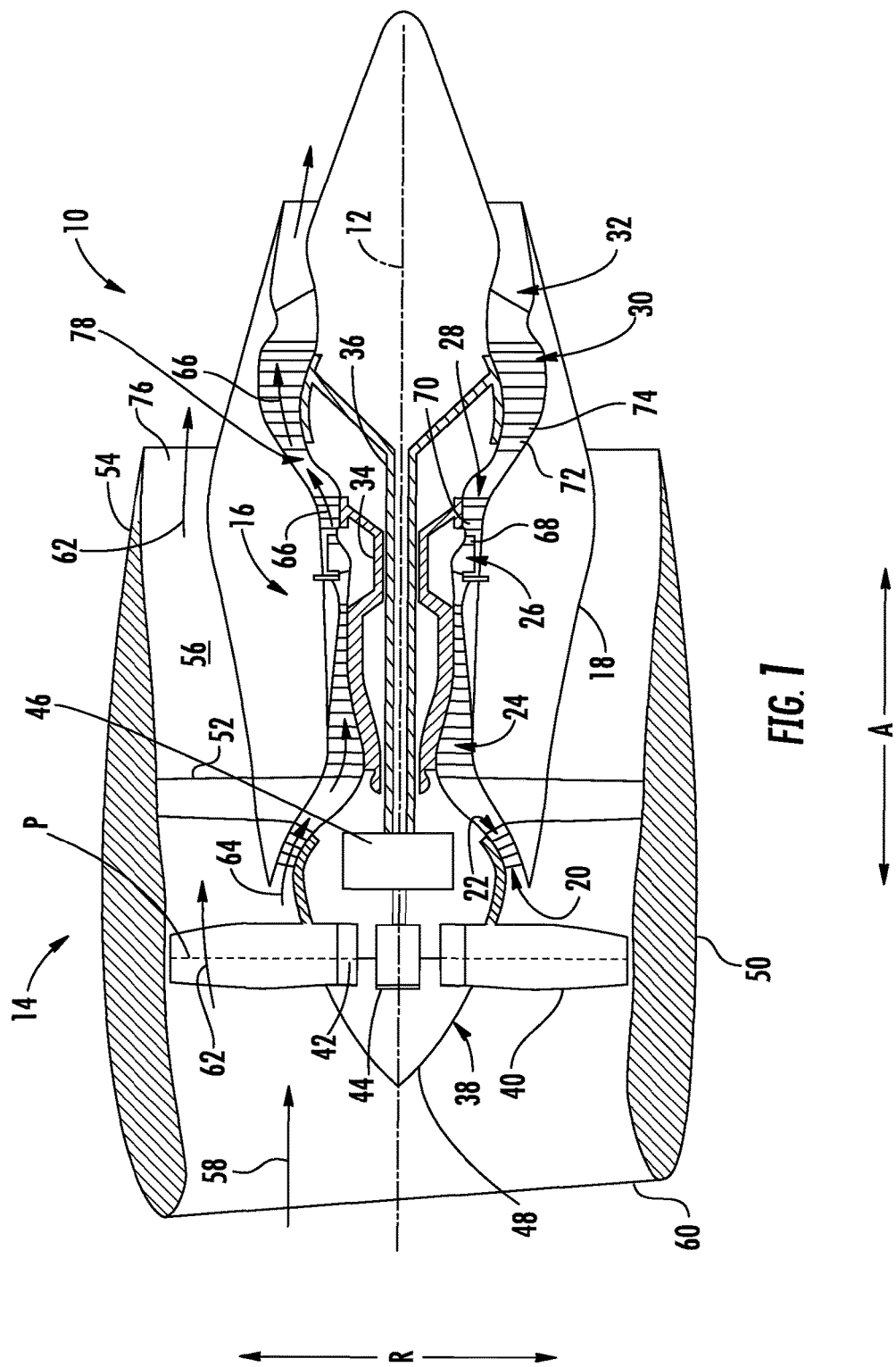
FIG. 1 is a schematic, cross-sectional view of an exemplary gas turbine engine according to various embodiments of the present subject matter.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows. In addition, it should be appreciated that the term "fluid" as used herein includes any material or medium that flows, including, but not limited to, gas and air.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP shaft 36 across a power gear box 46. The power gear box 46 includes a plurality of gears for stepping down the rotational speed of the LP shaft 36 to a more efficient rotational fan speed.

Referring still to the exemplary embodiment of FIG. 1, the disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that the nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It should be appreciated, however, that the exemplary turbofan engine 10 depicted in FIG. 1 is by way of example only, and that in other exemplary embodiments, the turbofan engine 10 may have any other suitable configuration.

Indeed, one skilled in the art will appreciate that embodiments of the present disclosure may be employed in many other types of gas engines.

Figure 2:
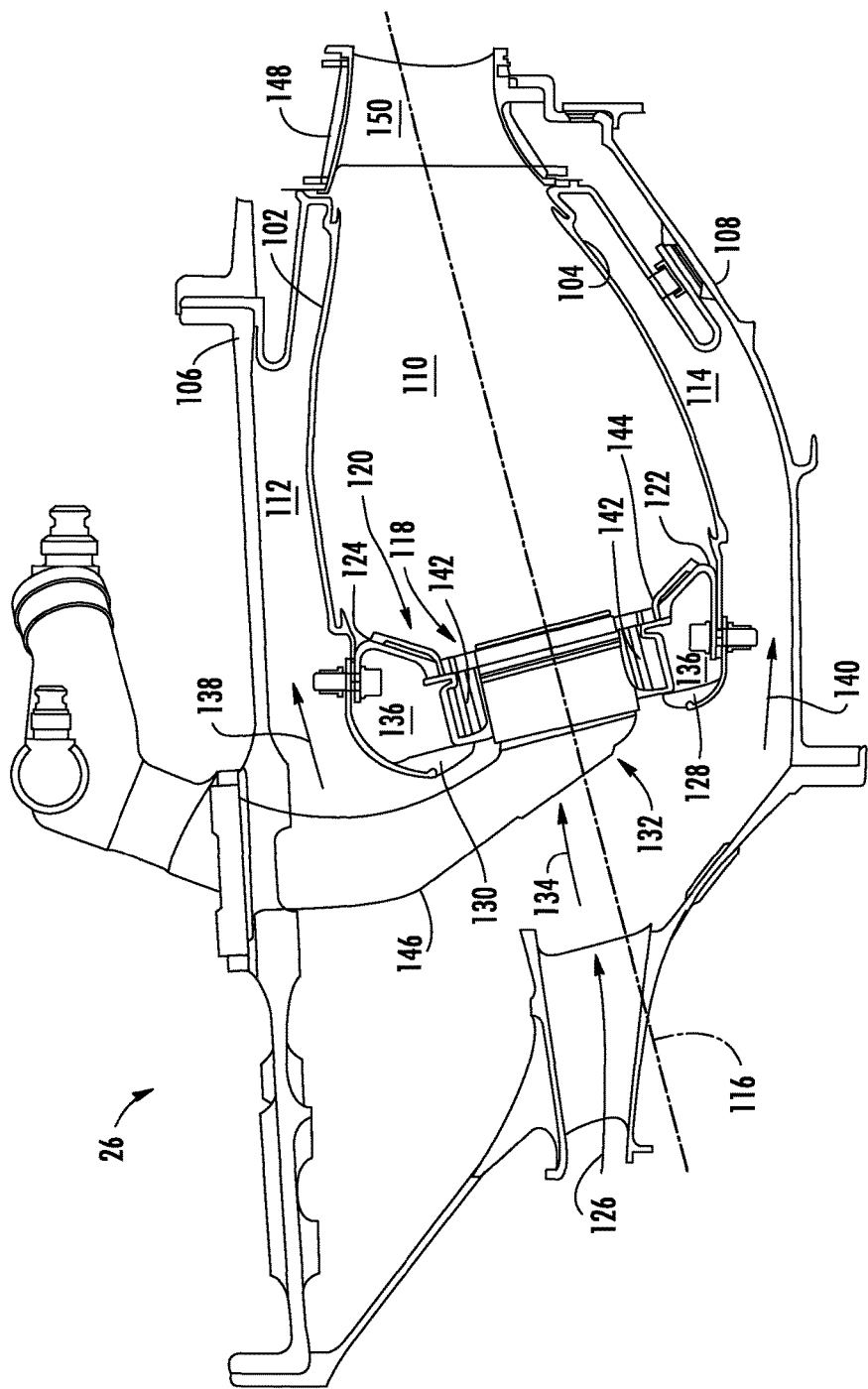
FIG. 2 is a schematic, cross-sectional view of one embodiment of a combustor suitable for use within the gas turbine engine shown in FIG. 1.

Referring now to FIG. 2, a schematic cross-sectional view of one embodiment of a combustor 26 suitable for use within the gas turbine engine 10 described above is illustrated in accordance with aspects of the present subject matter. In the exemplary embodiment, combustor 26 is a single annular combustor. However, one skilled in the art will appreciate that the combustor may be any other combustor, including, but not limited to, a double annular combustor or a can-annular combustor.

As shown in FIG. 2, combustor 26 includes an outer liner 102 and an inner liner 104 disposed between an outer combustor casing 106 and an inner combustor casing 108. Outer and inner liners 102 and 104 are spaced radially from each other such that a combustion chamber 110 is defined therebetween. Outer liner 102 and outer casing 106 form an outer passage 112 therebetween, and inner liner 104 and inner casing 108 form an inner passage 114 therebetween. Combustor 26 also includes a longitudinal axis 116 which extends from a forward end to an aft end of combustor 26 as shown in FIG. 2.

The combustor 26 may also include a combustor assembly 118 comprising an annular dome 120 mounted upstream of the combustion chamber 110 that is configured to be coupled to the forward ends of the outer and inner liners 102, 104. More particularly, the combustor assembly 118 includes an inner annular dome 122 attached to the forward end of the inner liner 104 and an outer annular dome 124 attached to the forward end of the outer liner 102.

As shown in FIG. 2, the combustor 26 may be configured to receive an annular stream of pressurized compressor discharge air 126 from a discharge outlet of the high pressure compressor 24. To assist in directing the compressed air, the annular dome 120 may further comprise an inner cowl 128 and an outer cowl 130 which may be coupled to the upstream ends of inner and outer liners 104 and 102, respectively. In this regard, an annular opening 132 formed between inner cowl 128 and outer cowl 130 enables compressed fluid to enter combustor 26 through a diffuse opening in a direction generally indicated by arrow 134. The compressed air may enter into a first cavity 136 defined at least in part by the annular dome 120. As will be discussed in more detail below, a portion of the compressed air in the first cavity 136 may be used for combustion, while another portion may be used for cooling the combustor 26.

In addition to directing air into first cavity 136 and the combustion chamber 110, the inner and outer cowls 128, 130 may direct a portion of the compressed air around the outside of the combustion chamber 110 to facilitate cooling liners 102 and 104. For example, as shown in FIG. 2, a portion of the compressor discharge air 126 may flow around the combustion chamber 110, as indicated by arrows 138 and 140, to provide cooling air to outer passage 112 and inner passage 114, respectively.

In certain exemplary embodiments, the inner dome 122 may be formed integrally as a single annular component, and similarly, the outer dome 124 may also be formed integrally as a single annular component. It should be appreciated, however, that in other exemplary embodiments, the inner dome 122 and/or the outer dome 124 may alternatively be formed by one or more components joined in any suitable manner. For example, with reference to the outer dome 124, in certain exemplary embodiments, the outer cowl 130 may be formed separately from the outer dome 124 and attached to the forward end of the outer dome 124 using, e.g., a welding process or a mechanical fastener. Additionally, or alternatively, the inner dome 122 may have a similar configuration.

The combustor assembly 118 further includes a plurality of mixer assemblies 142 spaced along a circumferential direction between the outer annular dome 124 and the inner dome 122. In this regard, a plurality of circumferentially-spaced contoured cups 144 may be formed in the annular dome 120, and each cup 144 defines an opening in which a mixer assembly 142 is mounted for introducing the air/fuel mixture into the combustion chamber 110. Notably, compressed air may be directed from the compressor section 26 into or through one or more of the mixer assemblies 142 to support combustion in the upstream end of the combustion chamber 110.

Fuel is transported to the combustor 26 by a fuel distribution system (not shown), where it is introduced at the front end of a burner in a highly atomized spray from a fuel nozzle. In an exemplary embodiment, each mixer assembly 142 may define an opening for receiving a fuel injector 146 (details are omitted for clarity). The fuel injector 146 may inject fuel in an axial direction (i.e., along longitudinal axis 116) as well as in a generally radial direction, where the fuel may be swirled with the incoming compressed air. Thus, each mixer assembly 142 receives compressed air from annular opening 132 and fuel from a corresponding fuel injector 146. Fuel and pressurized air are swirled and mixed together by mixer assemblies 142, and the resulting fuel/air mixture is discharged into combustion chamber 110 for combustion thereof.

The combustor 26 may further comprise an ignition assembly (e.g., one or more igniters extending through the outer liner 102) suitable for igniting the fuel-air mixture. However, details of the fuel injectors and ignition assembly are omitted in FIG. 2 for clarity. Upon ignition, the resulting combustion gases may flow in a generally axial direction (along longitudinal axis 116) through the combustion chamber 110 into and through the turbine section of the turbofan engine 10 where a portion of thermal and/or kinetic energy from the combustion gases is extracted via sequential stages of turbine stator vanes and turbine rotor blades. More specifically, the combustion gases may flow into an annular, first stage turbine nozzle 148. As is generally understood, the nozzle 148 may be defined by an annular flow channel that includes a plurality of radially-extending, circularly-spaced nozzle vanes 150 that turn the gases so that they flow angularly and impinge upon the first stage turbine blades (not shown) of the HP turbine 28 (FIG. 1).

Figure 3:
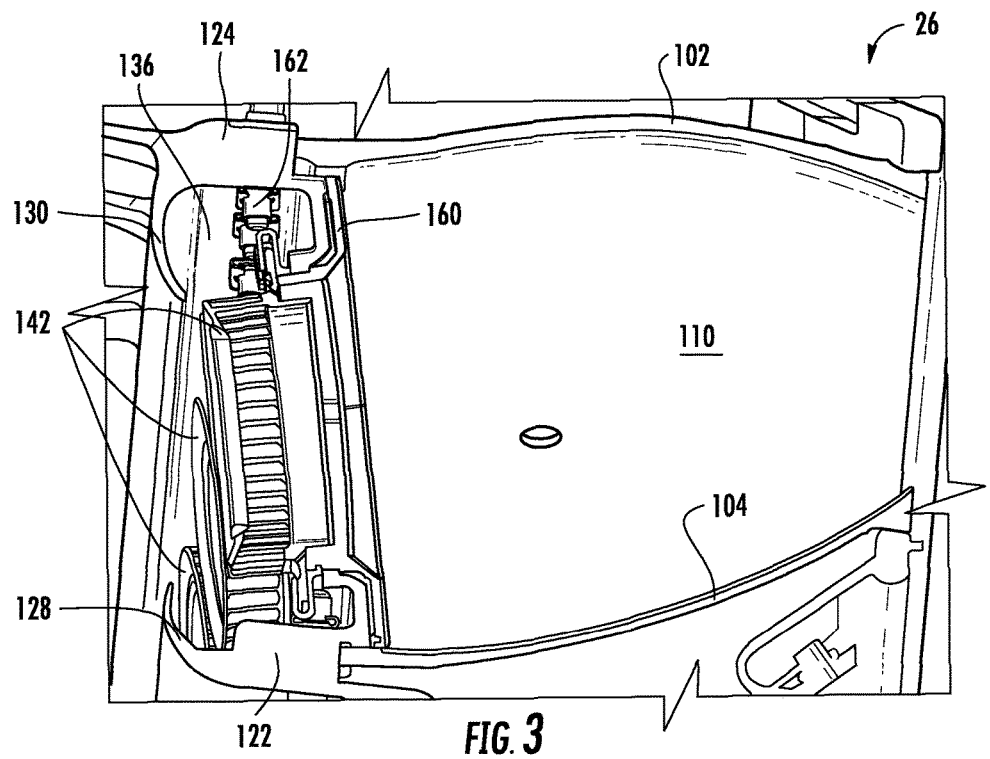
FIG. 3 is a schematic, cross-sectional view of the exemplary combustor assembly of FIG. 2.

Referring now to FIGS. 3-6, close-up cross-sectional views are provided of combustor section 26 according to one embodiment. For example, as shown in FIG. 3, the plurality of mixer assemblies 142 are placed circumferentially within the annular dome 120 around the gas turbine engine 10. Fuel injectors (not shown) are disposed in each mixer assembly 142 to provide fuel and support the combustion process. Each dome has a heat shield, for example, a deflector plate 160, which thermally insulates the annular dome 120 from the extremely high temperatures generated in the combustion chamber 110 during engine operation. The inner and outer annular domes 122, 124 and the deflector plate 160 may define a plurality of openings (e.g., contoured cups 144) for receiving the mixer assemblies 142. As shown the plurality of openings are, in one embodiment, circular.

Compressed air (e.g., 126) flows into the annular opening 132 where a portion of the air 126 will be used to mix with fuel for combustion and another portion will be used for cooling the dome deflector plate 160. The fuel injector assembly 146 is omitted in FIG. 3 for clarity, but compressed air may flow around the injector and through the mixing vanes around the circumference of the mixing assemblies 142, where it is mixed with fuel and directed into the combustion chamber 110. Another portion of the air enters into a cavity 136 defined by the annular dome 120 and the inner and outer cowls 128, 130. As will be discussed in more detail below with respect to FIGS. 4-6, the compressed air in cavity 136 is used, at least in part, to cool the annular dome 120 and deflector plate 160.

Figure 4:
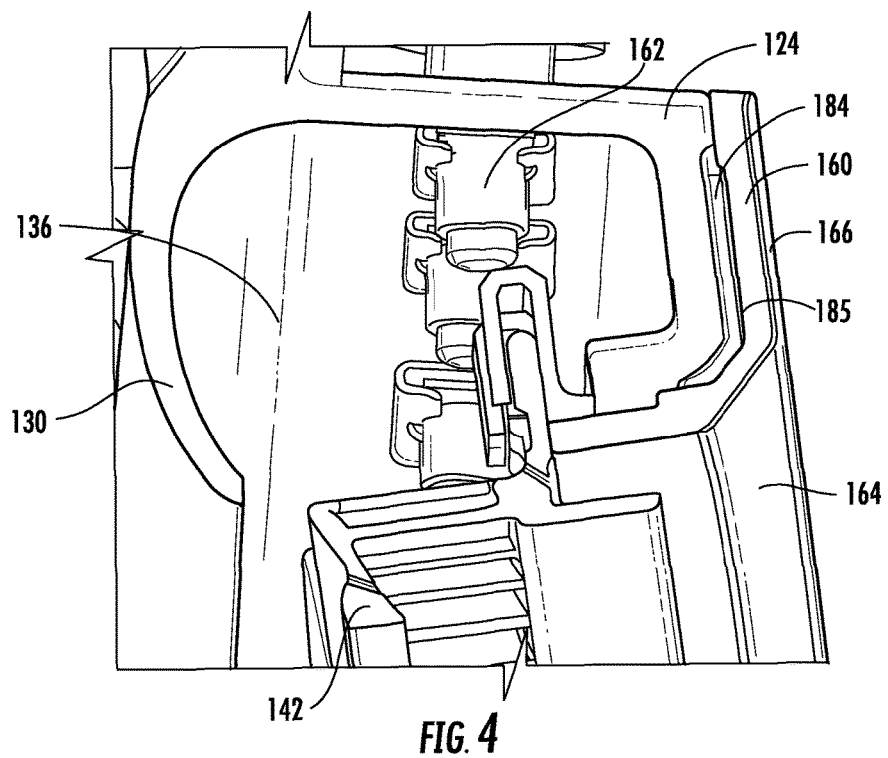
FIG. 4 is a close-up, cross-sectional view of the outer annular dome in the exemplary combustor of FIG. 3.

For example, FIG. 4 shows a close-up cross-sectional view of the upper annular dome 124, which defines cavity 136. Although the remaining discussion is in reference to a singular cavity 136, one skilled in the art will appreciate that in some embodiments, each cross-section of the combustor may comprise two or more cavities. As can be seen, cavity 136 is defined between the outer cowl 130 and dome 124, which may be connected to the outer liner 102 by a series of fasteners (e.g., fastener 162). Although the depicted fastener 162 is a bolt, embodiments of the present disclosure can use any suitable means for connecting the pieces together, including screws, bolts, rivets, pins, etc.

Each mixer assembly 142 is disposed in a respective contoured cup 144 and may be attached to the annular dome 120. The deflector plate 160 extends from the mixer assembly 142 to the outer liner 102 and is shaped to have a conical surface 164 and a flat surface 166. In the illustrated embodiment, the deflector plate 160 is contoured such that it extends a short distance in the axial direction (i.e., along longitudinal axis 116) toward the aft end of the combustion chamber 110 before it angles outward toward the outer liner.

Figure 5:
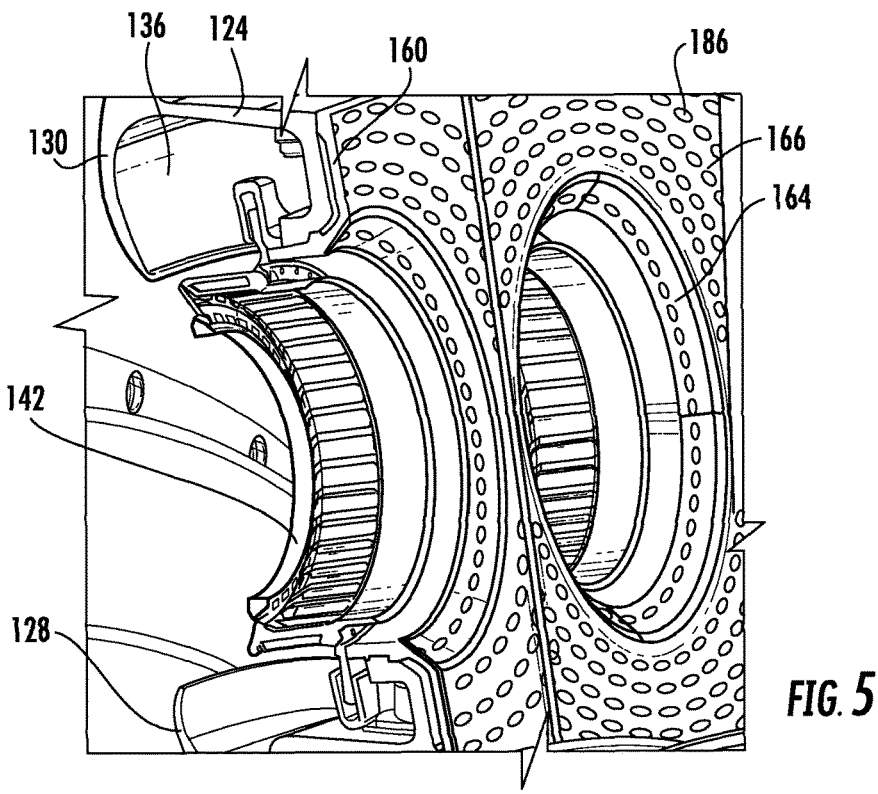
FIG. 5 is a close-up, perspective cross-sectional view of an exemplary combustor assembly of FIG. 3.

The angled portion of the deflector plate 160, referred to herein as the conical surface 164, may be defined relative to longitudinal axis 116. The conical surface 164 may have a constant angle around the circumference of each contoured cup 144, such that the surface is entirely conical. By contrast, the angle of the conical surface 164 may vary around the circumference of the contoured cup 144. Indeed, the angle of the conical surface 164 may even vary for each contoured cup 144 around the annular combustor 26. For example, as shown in FIG. 5, the angle at the radially inner and outer portions of the conical surface is approximately 45°, while the conical angle at the radial midpoint of the contoured cup 144 is 25°. However, these angles may be varied to improve performance of the combustor 26. For example, the conical angle at the radially inner and outer portions of the outer surface may vary between 15° and 75°, depending on the application and configuration of the combustor 26. In addition, the angle of the radial midpoint of the conical surface may be larger or smaller than 25° (e.g., about 15° to about 40°) depending on the spacing of adjacent fuel injectors 146 and mixer assemblies 142. The circumference of the conical surface 164 of each contoured cup 144 may therefore have a constant angle relative to longitudinal axis 116. Alternatively, the angle of the conical surface 164 may vary around the circumference of each contoured cup 144, and the conical surface 164 of each contoured cup 144 may differ from other contoured cups 144 around the combustor 26.

The deflector plate 160 then extends from the conical surface 164 in a generally radial direction (i.e., perpendicular to longitudinal axis 116) toward the outer liner 102. This portion is referred to as the flat surface 166 of the deflector plate 160. The flat surface 166 of the annular dome 120 is substantially perpendicular to the longitudinal axis 116 in the exemplary embodiment, but one skilled in the art will appreciate that it may also be angled in accordance with the needs of a particular application.

The dome 120 and deflector plates 160 are thus contoured to stabilize the mixer assembly 142 airflow in a substantially non-varying flow pattern inside the combustion chamber 110. The stabilizing conical face 164 is contoured around the mixer assembly 142 and longitudinal axis 116 at constant or varying angles to support an annular combustion chamber 110. More specifically, the conical face 164 can generate an improved flow pattern emanating from the mixer assembly 142. The flat face 166 can set up a non-varying corner recirculation zone to help with flow stability. The combustor 26 thereby achieves improved efficiency and performance. However, because the combusted fuel/air mixture has an extremely high temperature, and because the conical face 164 of the annular dome 120 tends to maintain the flame closer to the dome surface 180, the dome surface 180 can experience increased temperatures which can degrade the component.

For the embodiments depicted, the inner liner 104, the outer liner 102, deflector plate 160, and the other combustor components subjected to high temperatures may be formed of a ceramic matrix composite (CMC) material, which is a non-metallic material having high temperature capability and low ductility. Exemplary CMC materials utilized for such liners 102 and 104 may include silicon carbide, silicon, silica or alumina matrix materials and combinations thereof. Ceramic fibers may be embedded within the matrix, such as oxidation stable reinforcing fibers. By contrast, the inner dome 122 and outer dome 124 may be formed of a metal, such as a nickel-based superalloy or cobalt-based superalloy. Additionally, or alternatively, these components may be treated with a thermal barrier coating (TBC) as is known in the art. Thus, the inner and outer liners 102 and 104 may be better able to handle the extreme temperature environment presented in the combustion chamber 110. Although high temperature materials may be used to improve the lifetime of the annular dome and other components, the cooling system described below can extend lifetime even further.

Figure 6:
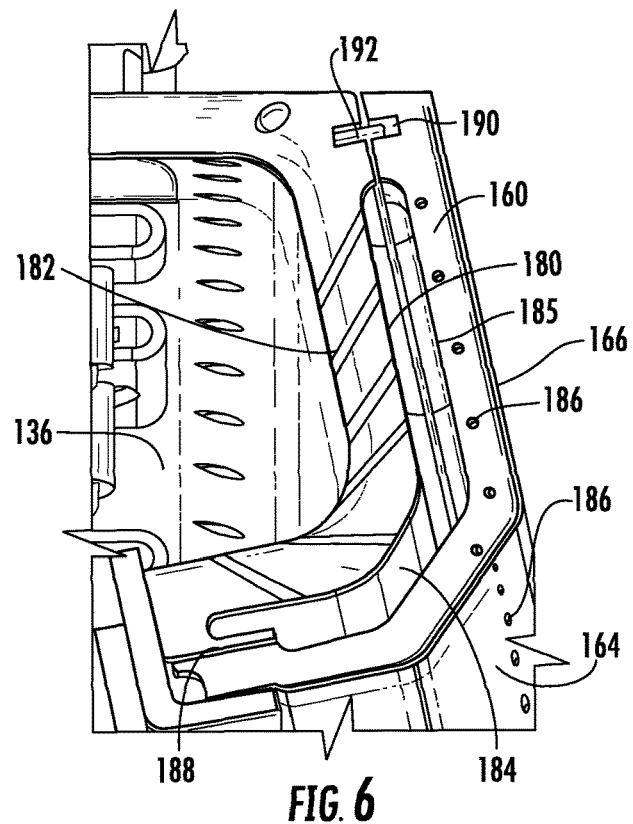
FIG. 6 is a schematic, cross-sectional view of the outer annular dome of the exemplary combustor of FIG. 2, showing details of the impingement and cooling holes in the dome and deflector plate.

Referring specifically to FIG. 6, a method of cooling the dome surface 180 will be described. As shown, the dome 120 may comprise a plurality of impingement cooling holes 182 preferably located on the side of the dome 120 adjacent to the combustion chamber 110. These impingement holes 182 may be formed by drilling, stamping, or otherwise machining the dome surface 180. In the example embodiment, these impingement holes 182 are uniformly spaced and angled at 60° with respect to the dome surface 180. However, one skilled in the art will appreciate that the angle and spacing of the impingement holes 182 may be adjusted to improve performance. For example, the impingement holes 182 may be angled between about 30° and 90° in some embodiments.

As discussed above, deflector plate 160 may be placed between the dome 120 and the combustion chamber 110 to provide protection from the extreme temperatures present therein. A gap 184 may be provided between the dome surface 180 and the deflector plate 160, such that the air flowing through the impingement cooling holes 182 can provide cooling air to the back surface 185 of the deflector plate 160.

Still referring to FIG. 6, deflector plate 160 may include a plurality of cooling holes 186 on its conical surface 164 and/or flat surface 166. This multi-hole surface can provide a multi-hole film cooling effect to the side of the deflector plate 160 exposed in the combustion chamber 110, thus significantly reducing the temperatures it reaches during operation. In the example embodiment, these cooling holes 186 are uniformly spaced and angled at 60° with respect to the surface of the deflector plate 160. However, as one skilled in the art will appreciate, these cooling holes 186 may be arranged along the conical surface 164 and/or flat surface 166 of the deflector plate 160 and may be configured at different angles with respect to the surface of the deflector plate 160. For example, the cooling holes 186 may be angled between about 30° and 90° in some embodiments.

The gap 184 between the deflector plate 160 and dome surface 180 is preferably sealed to prevent leakage of cooling air. In the illustrated embodiment, a radially inner joint 188 may be formed by brazing the deflector plate 160 to the annular dome 120. A radially outer joint 190 may be formed by disposing a spline seal 192 in a receiving notch formed in both the annular dome 120 and the deflector plate 160. The spline seal 192 may be made from any material suitable for joining the dome and deflector and preventing the leakage of air. In the illustrated embodiment, the spline seal 192 is an annular loop of a thin piece of metal. However, one skilled in the art will appreciate that other means of sealing gap 184 are possible and within the scope of the present disclosure. For example, the inner and outer joints may be brazed together, both may use a spline seal, or the dome and deflector may even be manufactured as one integral component.

Sealing gap 184 in this manner creates a pocket of cooling air, minimizes leakage of cooling air flow, and supports multi-hole cooling through the deflector plate 160. In this manner, sealing gap 184 can minimize the total amount of cooling airflow needed for the deflector plate 160. For example, in an exemplary embodiment, the amount of cooling airflow is reduced by greater than 50%. This airflow can then be fed back to the mixer assemblies 142, resulting in a leaner fuel-air mixture and improved engine performance.

Figure 7:
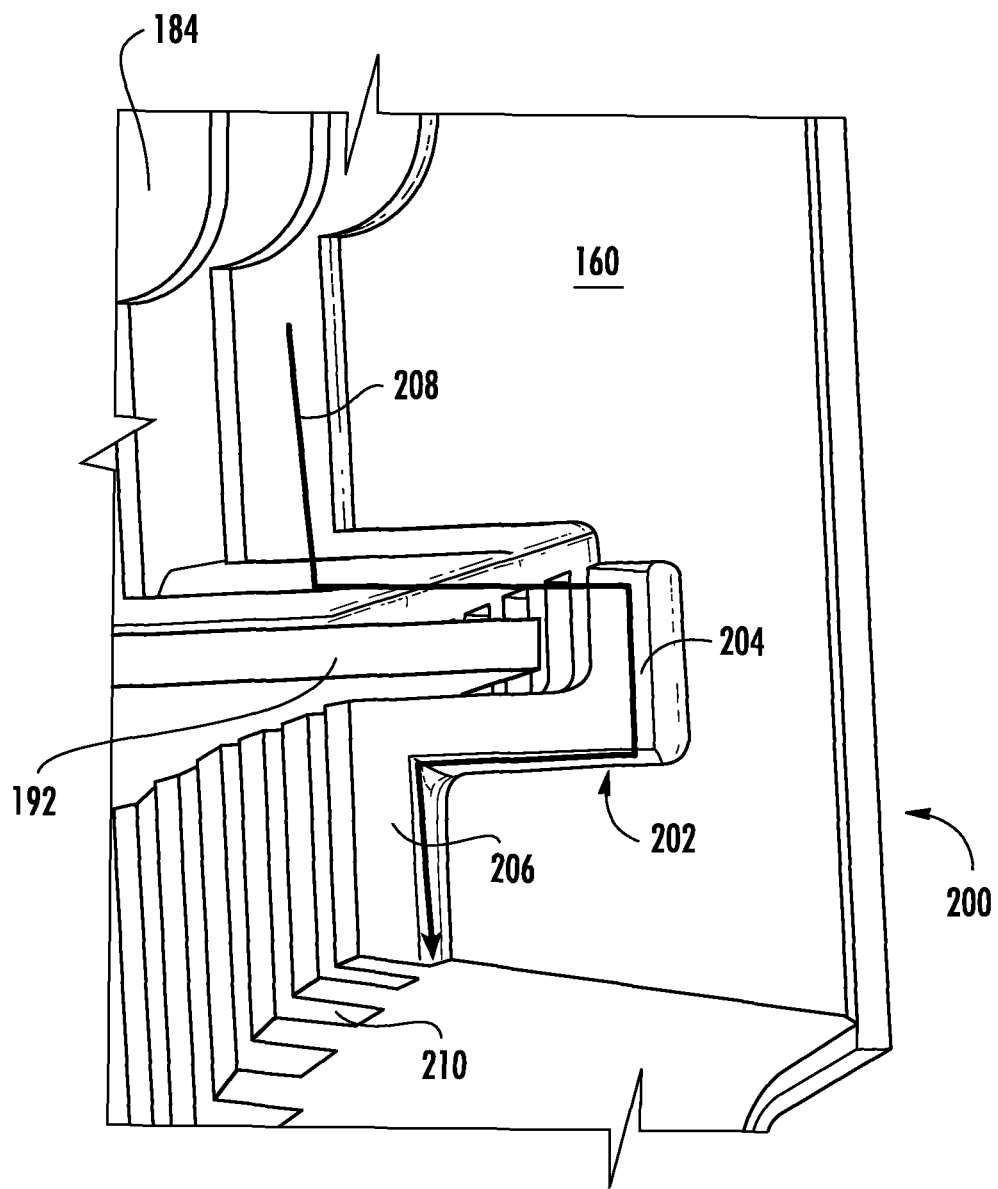
FIG. 7 is a schematic, cross-sectional view of an air bleeding system located in the deflector plate to provide a flow path around the spline seal in accordance with one embodiment.
Figure 8:
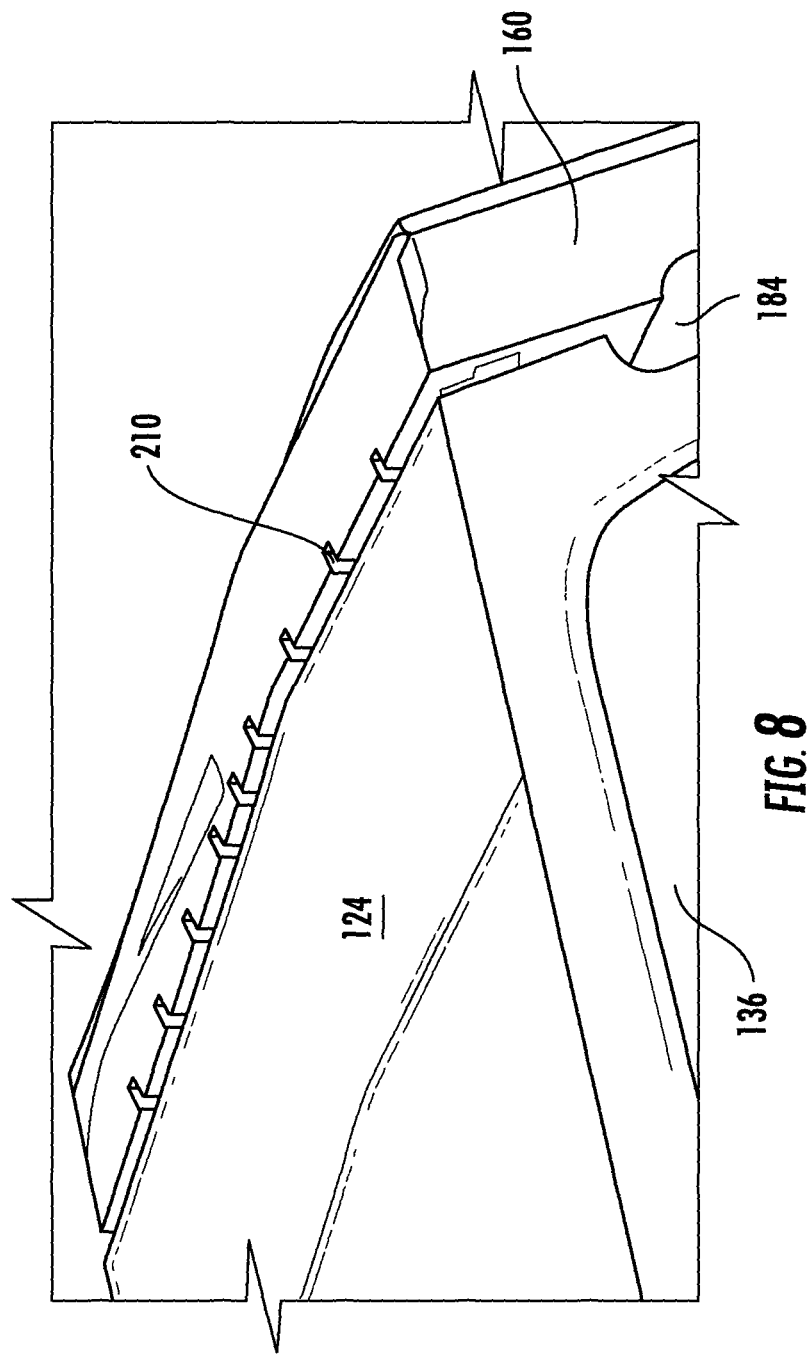
FIG. 8 is a perspective view of a deflector plate having an air bleeding system in accordance with various embodiments of the present disclosure.

In some embodiments, it may be desirable to allow some air to escape gap 184 and bleed into the combustion chamber 110. For example, as shown in FIGS. 7 and 8, an air bleeding system 200 may be provided which comprises a series of slots 202 formed in the deflector plate 160 of the combustor assembly 118. Each slot 202 may comprise, for example, a slot cavity 204 and a slot groove 206. The slot cavity 204 may be a recess in the wall of the deflector plate that provides flow communication between the gap 184 and the slot groove 206. In this regard, the series of slots 202 may be disposed in the deflector plate 160 at one end of the spline seal 192, and each slot cavity 204 may be wider than the width of the spline seal 192 so that air may flow around the edge of the spline seal 192 into slot groove 206. The slot groove 206 may be in flow communication with the combustion chamber 110 to allow the air to escape (as indicated by line 208 in FIG. 7) through a bleed air outlet (e.g., outlet 210 in FIG. 8). Although the air bleeding system 200 disclosed herein comprises a series of slots 202, one skilled in the art will appreciate that there are many other method for bleeding air from the gap 184. For example, one or more elongated slots may be disposed in the annular dome 120, or a series of holes may be drilled in the spline seal 192.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A combustor assembly for a gas turbine engine defining an axial direction, the combustor assembly comprising:
    a liner at least partially defining a combustion chamber;
    an annular dome defining a first cavity and having a plurality of impingement holes; and
    a deflector plate defining a conical surface and a flat surface, wherein a plurality of cooling holes are defined through the deflector plate,
    wherein the annular dome and the deflector plate are positioned together to define a second cavity, the second cavity being in fluid communication with the first cavity through the plurality of impingement holes, and the second cavity being in fluid communication with the combustion chamber through the plurality of cooling holes; and
    further wherein the deflector plate further defines a recessed slot that extends around an end of the spline seal, thereby providing fluid communication between the second cavity and the combustion chamber.

2. The combustor assembly of claim 1, wherein a radially outer portion of the second cavity is sealed by a spline seal between the annular dome and the deflector plate.

3. The combustor assembly of claim 1, wherein a radially inner portion of the second cavity is sealed by a brazed joint between the annular dome and the deflector plate.

4. The combustor assembly of claim 1, such that a first portion of the conical surface has a first angle, and a second portion of the conical surface has a second angle different from the first angle.

5. The combustor assembly of claim 4, wherein the first angle and the second angle are in a range of about 15° to 75°.

6. The combustor assembly of claim 1, wherein an angle of the conical surface is in a range of about 15° to 75°.

7. The combustor assembly of claim 1, wherein the liner and the deflector plate are each comprised of a ceramic matrix composite material, and wherein the annular dome is comprised of a metal material.

8. The combustor assembly of claim 1, wherein the deflector plate comprises a thermal barrier coating.

9. The combustor assembly of claim 1, wherein the impingement holes extend perpendicularly relative to a surface of the annular dome.

10. The combustor assembly of claim 1, wherein the impingement holes extend at an angle between about 30° and 90° relative to a surface of the annular dome.

11. The combustor assembly of claim 1, wherein the cooling holes extend perpendicularly relative to a surface of the deflector plate.

12. The combustor assembly of claim 1, wherein the cooling holes extend at an angle between about 30° and 90° relative to a surface of the deflector plate.

13. A gas turbine engine defining an axial direction, the gas turbine engine comprising:
    a compressor section;
    a turbine section mechanically coupled to the compressor section through a shaft; and
    a combustor assembly disposed between the compressor section and the turbine section, the combustor assembly comprising:
    a liner at least partially defining a combustion chamber;
    an annular dome defining a first cavity and having a plurality of impingement holes; and a deflector plate comprising a conical surface, a flat surface, and a plurality of cooling holes, wherein the annular dome and the deflector plate define a second cavity, the second cavity being in fluid communication with the first cavity through the plurality of impingement holes, and the second cavity being in fluid communication with the combustion chamber through the plurality of cooling holes; and further wherein the deflector plate further defines a recessed slot that extends around an end of the spline seal, thereby providing fluid communication between the second cavity and the combustion chamber.

14. The gas turbine engine of claim 13, wherein a radially outer portion of the second cavity is sealed by placing a spline seal between the annular dome and the deflector plate.

15. The gas turbine engine of claim 13, wherein a radially inner portion of the second cavity is sealed by brazing a joint between the annular dome and the deflector plate.

16. The gas turbine engine of claim 13, such that a first portion of the conical surface has a first angle, and a second portion of the conical surface has a second angle different from the first angle, and wherein the first angle and the second angle are in a range of about 15° to 75°.

17. The gas turbine engine of claim 13, wherein the impingement holes are angled at about 60° relative to the surface of the annular dome.

18. The gas turbine engine of claim 13, wherein the cooling holes are angled at about 60° relative to the surface of the deflector plate.

* * * * *